(No Model.)
M. WILLIAMS.
HARNESS.
No. 380,376. Patented Apr. 3, 1888.
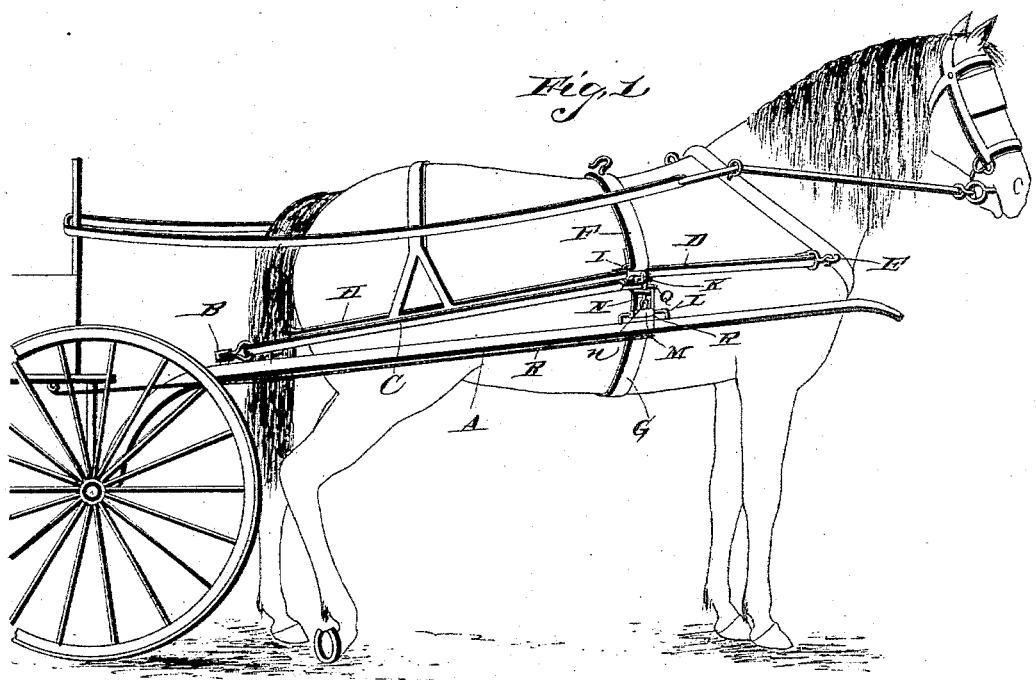
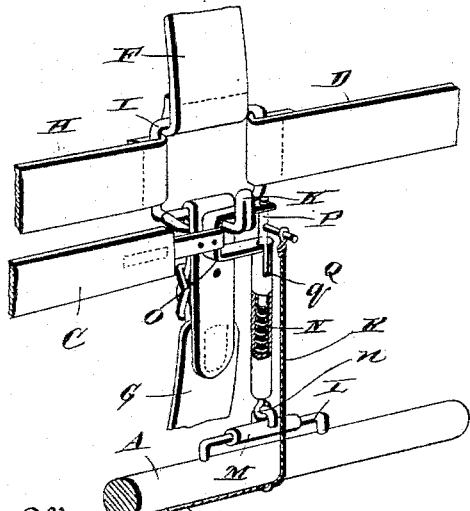
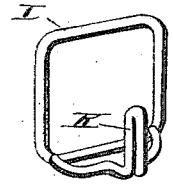
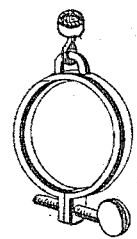
Inventor
Meade Williams.
By his Attorneys.

UNITED STATES PATENT OFFICE.

MEADE WILLIAMS, OF MOUNT VERNON, INDIANA.

HARNESS.

SPECIFICATION forming part of Letters Patent No. 380,376, dated April 3, 1888.

Application filed January 4, 1888. Serial No. 259,755. (No model.)

*To all whom it may concern:*

Be it known that I, MEADE WILLIAMS, a citizen of the United States, residing at Mount Vernon, in the county of Posey and State of Indiana, have invented new and useful Improvements in Harness, of which the following is a specification.

My invention relates to improvements in harness; and it has for its object to provide means whereby after the harness has been properly adjusted on the horse the attachment to the wagon may be accomplished by a single operation. In the ordinary practice several operations—such as attaching the traces to the whiffletree, attaching the thill-tugs to the thills, &c.—are necessary.

A further object of the invention is to provide means whereby the connection with the wagon may be broken by a simple operation to allow the horse to escape. The object of this is to enable the driver to release a runaway horse without moving from his seat in the vehicle.

The above results are attained, mainly, by dividing the traces into two portions—namely, a rear portion, which is attached at its rear end to the end of the whiffletree and at its front end to a movable hook or other connection on the thill, and a front portion, which is attached at its front end to the collar and at its rear end to a ring which depends from the backband of the harness. This ring is adapted to be engaged by the above-mentioned hook or connection on the thill, and when this engagement is made it will be readily seen that the adjacent ends of the two portions of the trace are connected, and the result attained will be the same as if the trace were in a single piece. The ends of the belly-band and the breeching-strap are also connected to the above ring, which thus forms a universal connection for the various parts of the harness. I further provide a strong cord or chain which is attached at one end to the hook on the thill in such a way that when the former (the rear end of which is disposed near the driver's seat) is pulled the ring is released and the horse is free to pass from between the thills.

My invention is more fully described hereinafter in connection with the accompanying drawings, wherein—

Figure 1 is a view of a portion of a vehicle, showing a horse attached thereto by means of harness constructed according to my invention. Fig. 2 is a detail perspective view of the connection between the portion of the harness on the horse and the vehicle. Fig. 3 is a detail perspective view of the ring. Fig. 4 is a detail view of a modified form of attachment to the thill.

Referring by letter to the drawings, A represents a thill; B represents a whiffletree, to which is attached the rear portion, C, of the trace; D represents the front portion of the trace, which is attached to the collar E; F represents the back-band; G, the belly-band, and H the breeching-strap, all of the ordinary construction.

A ring, I, preferably of rectangular shape, is arranged at the rear end of the front portion of the trace, which is attached to the front side thereof. The front end of the breeching-strap is attached to the rear side of the ring, and the adjacent ends of the back-band and the belly-band are secured, respectively, to the upper and lower sides of the ring. It will be seen that this ring forms the connection between the adjacent ends of four straps.

The ring is provided at its lower end with a hook, K, the function of which will be fully explained hereinafter.

L represents a short keeper which is arranged longitudinally on the thill at a point opposite the position of the ring on the harness, and on this keeper is arranged a sliding sleeve, M, for a purpose to be explained.

N represents a snap-hook which is provided at its lower end with a ring, n, which is attached loosely to the sliding sleeve, and it will therefore be seen that the said hook is capable of free forward and backward movement. The eye O of the said hook is loop-shaped, and the front end of the rear portion of the trace is attached thereto. The spring-actuated bolt P in the snap-hook closes the mouth of the loop O normally, and it is provided with a small stud or handle, Q, to enable the bolt to be readily retracted from engagement with the socket or opening q in the opposite side of the loop O. The hook K is adapted to be engaged in the loop O; but it is obvious that if the bolt which closes the said loop is retracted the hook K will be released and it will readily slip out. It will be seen that the mouth of the loop O is forward to allow an easy disengagement of the hook K.

The operation and advantages of my invention are as follows: After the harness has been secured to the horse and the ends of the front portions of the traces, the breeching-strap, the back-band, and the belly-band are all secured to the rings, the horse is placed between the thills, and the hooks K are engaged in the loops O, and the horse is secured to the vehicle. It will be seen that there is but one operation upon each side of the horse.

It will be understood that the effectiveness of harness thus constructed and applied is not less than that of harness constructed in the ordinary way. The portions of the traces are connected together at their adjacent ends quite as effectively and strongly as if they were each made in a single piece, and their motion forward and backward with the movement of the shoulders of the horse is quite as free. The sleeve on the keeper L slides readily, and in addition to this it will be seen that the hook N is pivotally connected to the said sleeve, thereby giving a still greater movement. Further, a cord or chain, R, is attached to the bolt of the snap-hook on each thill, and it is carried rearward to within easy reach of the driver in the vehicle. When the said cords or chains are pulled, they will retract the bolts of the snap-hooks and allow the hooks K to pass out of engagement with the latter. The cords or chains are passed through the rings at the lower ends of the snap-hooks (or through a similar keeper) to enable them to draw directly in line with the motion of the bolts.

It will be understood that the horse-detaching device may be omitted and the ring connected to the sliding sleeve in some simpler manner, as by an ordinary link or pivoted bar. In either case the labor of hitching and unhitching a horse is the same, as it is all accomplished by a single movement.

It will be observed that this form of horse-detacher is very simple, and there is no use of the complicated or cumbersome mechanism to be found in some detachers.

If desired, the sliding sleeve may be omitted and the snap-hook connected loosely to an adjustable band on the thill, as shown in Fig. 4.

Having thus described my invention, I claim—

1. The combination of the keepers on the thills, the sleeves sliding thereon, the rear portions of the traces connected at their ends, respectively, to the ends of the whiffletree and the said sliding sleeves, the front portions of the traces attached to the harness in the ordinary manner, and the rings at their rear ends connected to the sliding sleeves, substantially as and for the purpose specified.

2. The combination of the sliding sleeves on the thills, the snap-hooks connected thereto, the rear portions of the traces attached to the ends of the whiffletree and the said snap-hooks, the front portions of the traces attached to the harness, and the rings at their rear ends engaged by the said hooks, substantially as and for the purpose specified.

3. The combination of the sliding sleeves, the snap-hooks attached to the sleeves, the rear portions of the traces attached to the whiffletree and the said hooks, the front portions of the traces, and the rings attached to their rear ends and provided with hooks K K, engaging with the said snap-hooks, substantially as and for the purpose specified.

4. The combination, with the front portions of the traces and the rings at their rear ends provided with hooks K, of the sliding sleeves on the thills, the snap-hooks having loops at their upper ends attached thereto, the sliding spring-actuated bolts in the hooks, the rear portions of the traces attached at their front ends to the loops of the said hooks, and means, substantially as described, whereby the spring-actuated bolts may be withdrawn to release the hooks K, substantially as and for the purpose specified.

5. The combination, with the front portions of the traces having rings at their rear ends provided with hooks K, of the snap-hooks attached to the thills of the vehicle and having spring-actuated bolts, the said snap-hooks being engaged with the hooks K, the rear portions of the traces attached to the snap-hooks, and chains or cords attached to the spring-actuated bolts and extended to within reach of the driver of the vehicle, substantially as and for the purpose specified.

6. The combination, with the thills having sliding sleeves thereon and snap-hooks loosely mounted thereon, of the ring attached to the harness and adapted to be engaged by the said hook, substantially as specified.

7. The combination, with the thills and the snap-hooks mounted loosely thereon and having spring-actuated bolts, of the ring attached to the harness and engaged by the said hook, and the cord or chain connected at one end to the said spring-actuated bolt and disposed at the other end within reach of the driver, substantially as and for the purpose specified.

In testimony that I claim the foregoing as my own I have hereto affixed my signature in presence of two witnesses.

MEADE WILLIAMS.

Witnesses:
JOHN RUMINER,
GEORGE H. WILSON.